Jan. 18, 1927.

J. A. FRIESEN 1,614,982

GOVERNOR MECHANISM

Filed August 27, 1921    5 Sheets-Sheet 1

Jacob A. Friesen
INVENTOR

Victor J. Evans
ATTORNEY

Jan. 18, 1927.  
J. A. FRIESEN  
1,614,982  
GOVERNOR MECHANISM  
Filed August 27, 1921  5 Sheets-Sheet 2
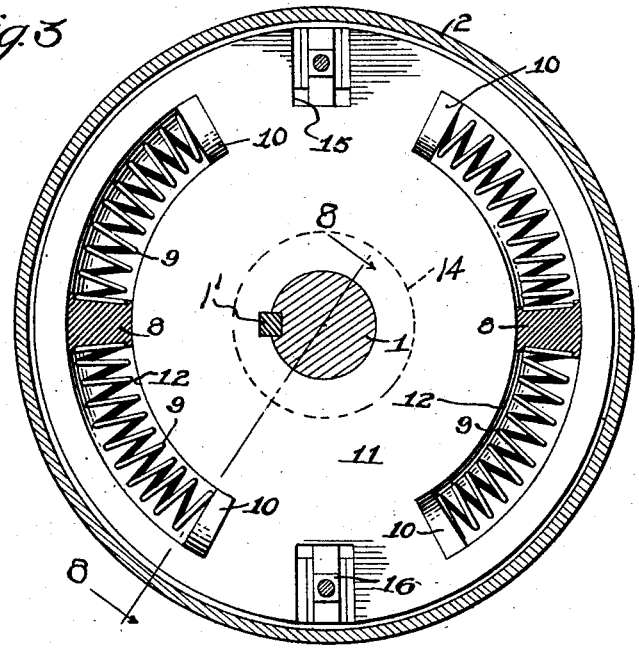
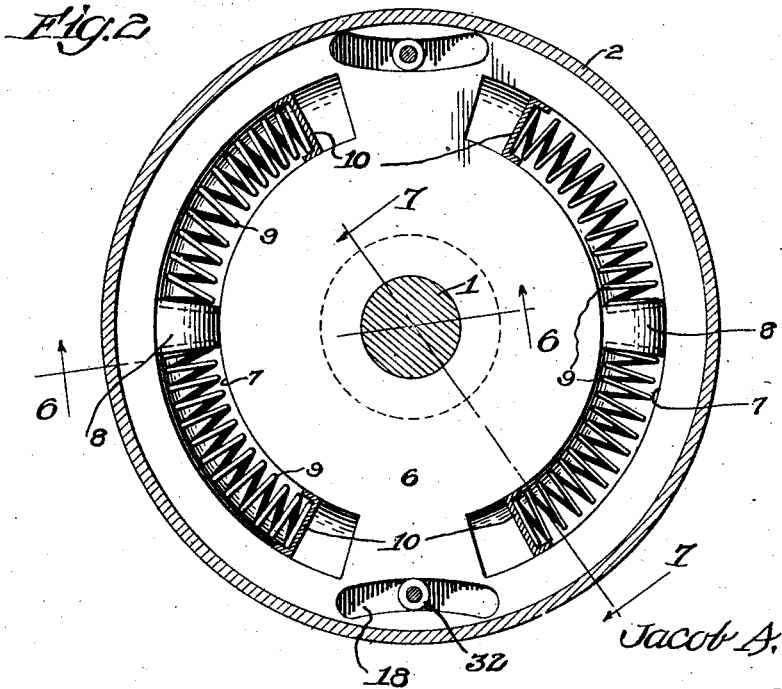
Jacob A. Friesen  
INVENTOR  
BY Victor J. Evans  
ATTORNEY

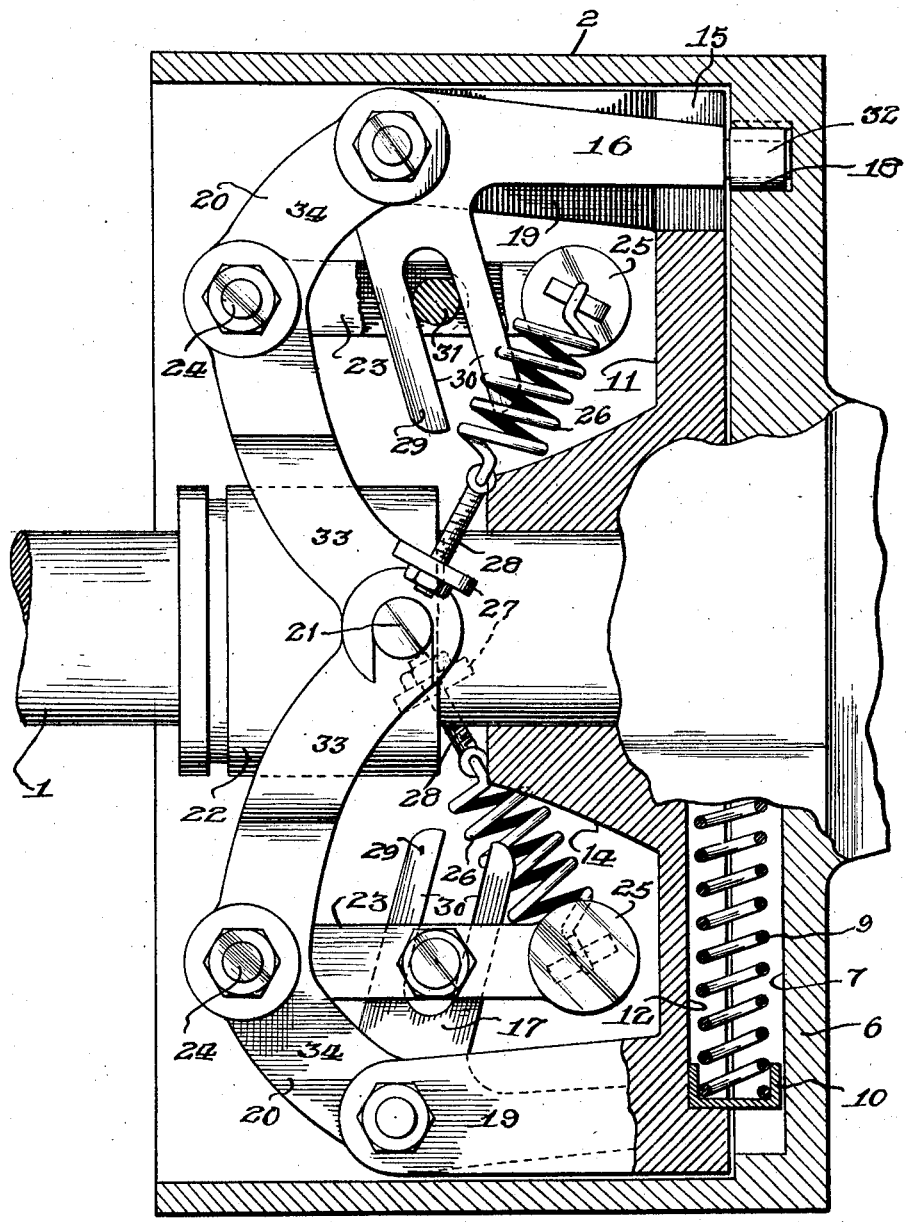

Jan. 18, 1927.
J. A. FRIESEN
1,614,982
GOVERNOR MECHANISM
Filed August 27, 1921    5 Sheets-Sheet 4
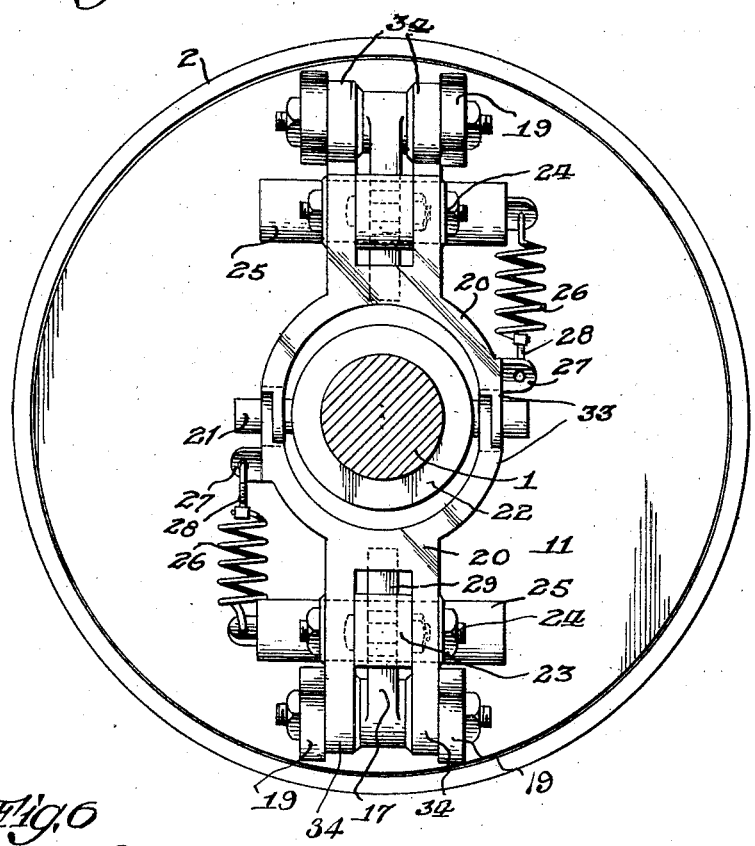
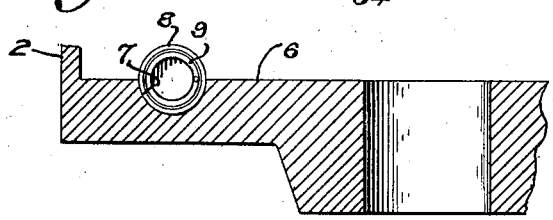
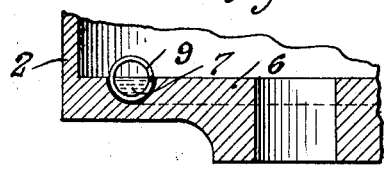
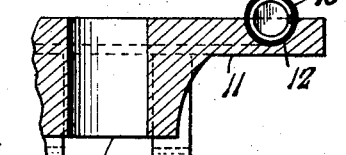
Jacob A. Friesen
INVENTOR
BY Victor J. Evans
ATTORNEY Jan. 18, 1927.　　　　　　　　　　　　　　　　1,614,982
J. A. FRIESEN
GOVERNOR MECHANISM
Filed August 27, 1921　　　5 Sheets-Sheet 5
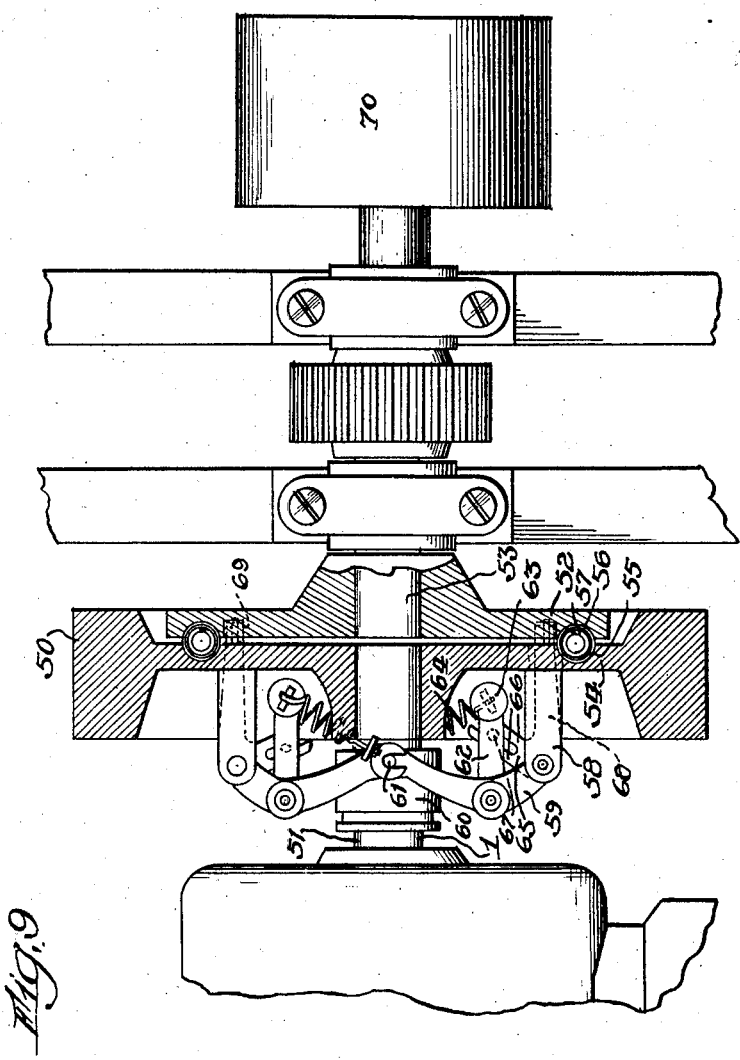
Jacob A. Friesen
INVENTOR
BY Victor J. Evans
ATTORNEY Patented Jan. 18, 1927.

1,614,982

UNITED STATES PATENT OFFICE.

JACOB A. FRIESEN, OF WINKLER, MANITOBA, CANADA.

GOVERNOR MECHANISM.

Application filed August 27, 1921. Serial No. 496,007.

This invention relates to governors and an object of the invention is to provide a governor mechanism particularly designed for use in connection with internal combustion engines, electric engines or analogous structures, and one which is designed to automatically regulate the feeding of power to the engine and also regulate the speed of the engine, as regulated by approved governors now in use.

Another object of the invention is to provide a governor as specified which can be easily attached to any existing approved make of engine or motor and also to provide a governor which, with slight alterations, may be employed in connection with a stationary engine to control the feeding of fuel to the engine in proportion to the load on the power takeoff pulley.

Other objects of the invention will appear in the following detailed description and in the accompanying drawings wherein Fig. 1 is a longitudinal section through the governor showing it assembled.

Fig. 2 is a section on the line 2—2 of Fig. 1 looking in the direction indicated by the arrow A.

Fig. 3 is a section on the line 3—3 of Fig. 1 looking in the direction indicated by the arrow B.

Fig. 4 is an enlarged detail partly in section of the governor mechanism.

Fig. 5 is a cross section through the governor taken on the line 5—5 of Fig. 1.

Fig. 6 is a detail section on the line 6—6 of Fig. 2.

Fig. 7 is a detail section on the line 7—7 of Fig. 2.

Fig. 8 is a detail section on the line 8—8 of Fig. 3.

Fig. 9 is a longitudinal section through a modified form of the governor mechanism showing it applied.

Figure 1:
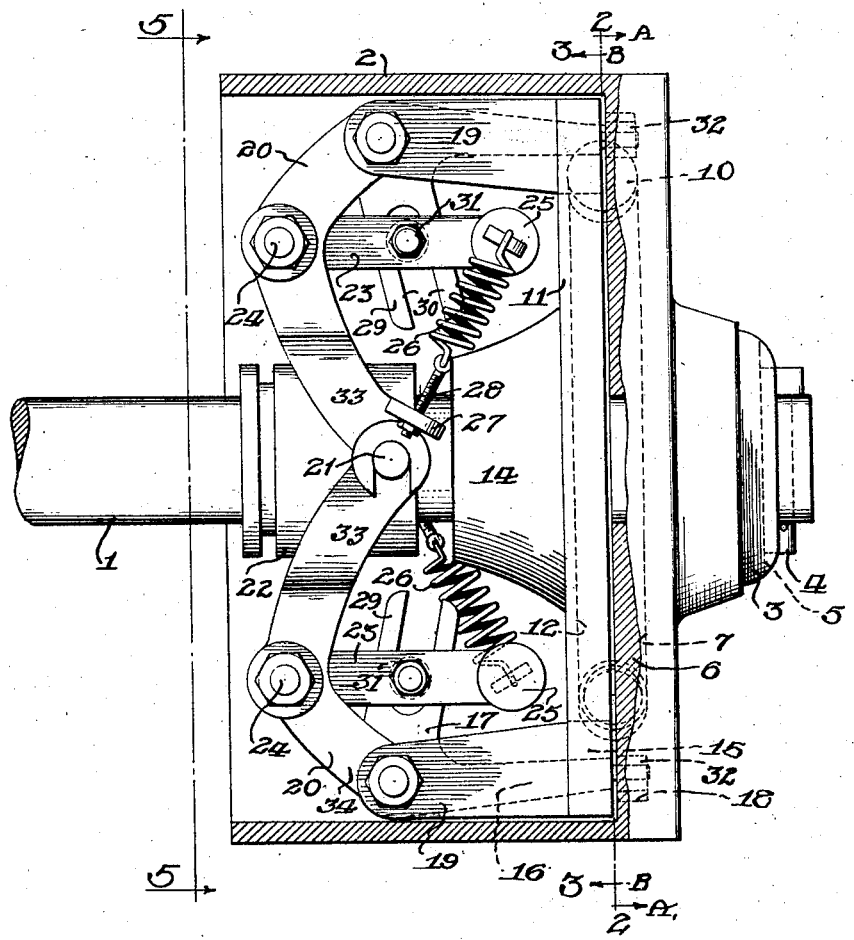

Referring more particularly to the drawings, 1 indicates an operating shaft included as a part of an internal combustion engine. This shaft 1 carries a driven pulley 2. This driven pulley 2 is mounted for movement relative to the operating shaft. The driven pulley 2 is held against longitudinal movement of the shaft in one direction by means of a washer 3 and transverse pins 4, which extend diametrically through the shaft 1 and into a recess 5 formed in the outer face of the washer. The web 6 of the pulley 2 is provided with arcuate grooves 7 in its inner face into which partition members 8 extend at diametrically opposed points providing substantially four spring receiving arcuate recesses which are substantially semi-circular in cross section as shown in Figures 6 and 7 of the drawing. Spiral springs 9 are mounted in the recesses 7 as shown in Fig. 2 of the drawing and their ends remote from the ends which engage the stops 8 engage corresponding stops 10 which are carried by the governor disc 11, at the ends of the arcuate substantially semi-circular recesses 12 formed in its face which faces the recessed surface of the web 6 thereby establishing yieldable driving connection between the governor disc 11 and the web 6 of the fly wheel or pulley 2.

The disc 11 has a hub 14 formed thereon and is keyed to the shaft 1 as at 1', Fig. 3, for rotation therewith. The disc 11 is provided with diametrically opposed cutout portions 15 intermediate the adjacent ends of the recesses 12 which cutout portions open out through the perimeter of the disc as clearly shown in Fig. 3 of the drawing.

Arms 16, which are formed upon the arms 17, extend through the cutout portions 15 and into arcuate recesses 18 which are formed in the web 6 intermediate the ends of the arcuate recesses 7. The arms 17 are pivotally carried by arms 19 which are in turn attached to the disc 11 in any suitable manner and the arms 19 are pivotally connected to arms 20 which are in turn pivotally connected to pins or trunnions 21 carried by an operating collar 22 which is slidably mounted upon the shaft 1. Weight carrying arms 23 are pivotally connected to the arms 20 as shown at 24 and they have governor weights 25 on their outer ends. Governor springs 26 are connected to the weights 25 and to ears 27 on the arms 20. Suitable adjustable eye bolts 28 are provided for connecting the springs 26 to the ears 27 so as to permit regulation of the tension of the springs as desired. The arms 17, which are substantially bell cranks, have angularly extending arms 29 formed thereon which are recessed, provide spaced arms 30 which engage upon opposite sides of pins 31 rotatably supported by the weight carrying arms 23 so as to establish connection between the arms 16 and 23. The arms 16 have rollers 32 rotatably supported by their outer ends, to permit movement of the arms in the recesses 18 with a minimum amount of friction. As clearly shown in Fig. 5 of the drawing the arms 20 each comprise forked ends 33 which engage upon opposite sides of the collar 22 and also comprise spaced arms 34 for receiving therebetween the governor weight arms 23.

In operation, as the load on the pulley 2 increases, the pulley will be retarded relative to the shaft 1 against the action of certain of the spring members 9. During this retarding of the pulley the rollers 32 are moved toward the ends of the slots 18, opposite the direction of the movement of the pulley, rocking the arms 17 about their pivots. As these arms 17 are rocked about their pivots the arms 23 are pivoted about their pivots 24 laterally from the shaft 1 imparting longitudinal movement to the collar 22 through the medium of the arms 33 and 34, in a direction toward the hub 14.

As these arms 23 are pivoted in this direction the weights 25, by reason of centrifugal force, move in the same direction with the arms and assist the arms 16 and 17 to pivot the arms 23 in the direction above mentioned.

As the load of the pulley decreases the rollers 32 will return to their central position in the slots 18 rocking the arms 16 in an opposite direction permitting the governor arms 23 to pivot toward the shaft 1 imparting movement to the arms 33 and 34 to move the collar 22 in an opposite direction away from the hub 14. It is apparent that by operatively connecting the collar 22 to a control rod (not shown) of a carburetor (not shown) the flow of fuel from the carburetor is controlled according to the load on the pulley 2. As the load decreases the collar 22 will be moved in the direction above described partially shutting off the carburetor to prevent an excess amount of fuel to flow from the carburetor and movement of the collar in the opposite direction, will open the carburetor to permit a greater flow of fuel upon increase of the load on the pulley 2.

It will be apparent from the foregoing operation that when the mechanism is free from load the rollers 32 will be disposed at the middle of the arcuate recesses 18.

In Fig. 9 of the drawings a modified form of the improved governor mechanism is shown, in which form the governor comprises a fly wheel 50 which is mounted upon the engine carried shaft 51 and a governor disc 52 which is mounted upon the driven shaft 53. The web 54 of the flywheel 50, and the disc 52 are provided with registration substantially semi-circular arcuate recesses 55 and 56 corresponding to the recesses 7 and 12, in which a plurality of spiral springs 57 are mounted which correspond to the springs 9 in the preferred form previously described, for establishing yieldable driving connection between the flywheel 50 and disc 52 and consequently between the shafts 51 and 53. The flywheel web 54 has arms 58 formed thereon and extending away from the disc 52, to which arms are pivotally connected arms 59 similar in construction and corresponding to the arms 20, being connected to the slidable collar 60 by suitable trunnions 61. The arms 59 carry weight carrying arms 62 and connected thereto are the ball weights 63 to which the governor springs 64 are connected. The governor springs 64 are connected to the arms 59 in the same manner in which the springs 26 are connected to the arms 20. Bell cranks 65 are pivotally connected to the arms 59 and have forked arms 66 which engage rollers 67 on the arms 62. The arms 68 of the bell cranks 66, project through suitable openings in the web of the flywheel 50 and engage in recesses 69 formed in the disc 52, operating in the same manner in which the arms 17 are operated. The shaft 53 carries the power takeoff pulley 70 and where the improved governor mechanism is built in the flywheel as shown in the modified form, it will regulate the engine's speed and the belt speed, that is, the speed of a belt driven by the pulley 70.

It is, of course, to be understood that the invention may be constructed in various other manners and the parts associated in different relations and therefore, I do not desire to be limited in any manner except as set forth in the claims hereunto appended.

Having thus described my invention what I claim is:

1. The combination with an operating shaft, of an operating member mounted for movement longitudinally of the shaft, a driven member mounted on the shaft and movable relative thereto and having oppositely diametrically disposed recesses formed therein, governor mechanism having operative connection with the operating member and including weight carrying arms and means controlling operation of the arms and having end portions working in the recesses, and means providing a yieldable driving connection between the driven member and governor mechanism.

2. The combination with an operating shaft, of an operating member mounted for movement longitudinally of the shaft, a driven member mounted on the shaft and movable relative thereto and having oppositely diametrically disposed recesses formed therein, governor mechanism having operative connection with the operating member and including weight carrying arms and means controlling operation of the arms and having end portions working in the recesses, and means providing a driving connection between the driven member and governor mechanism.

3. The combination with an operating shaft, of an operating member mounted for movement on the shaft, a driven member mounted on the shaft and movable relative thereto and having opposite diametrically disposed outwardly arcuated recesses formed therein, governor mechanism having operative connection with the operating member and including weight carrying arms and members controlling operation of the arms and having end portions working in the recesses.

4. The combination with an operating shaft, of an operating member mounted for movement longitudinally of the shaft, a recessed driven member mounted on the shaft and movable relative thereto and having opposite diametrically disposed recesses formed therein, governor mechanism confined in the recesses of the driven member and operatively connected to the operating member and including a driving member having opposite diametrically arranged recesses formed therein in registration with the recesses of the driven member and having portions projecting into the recesses of the driven member, and resilient members confined in the recesses on opposite sides of the projecting portions with adjacent end portions of the resilient members in abutment with the projecting portions providing a yieldable driving connection between the driving member and driven member.

In testimony whereof I affix my signature.

JACOB A. FRIESEN.